United States Patent
Chiba

(10) Patent No.: US 7,411,777 B2
(45) Date of Patent: Aug. 12, 2008

(54) ELECTROLYTIC SOLUTION FOR ELECTRIC DOUBLE LAYER CAPACITOR AND ELECTRIC DOUBLE LAYER CAPACITOR

(75) Inventor: Kazumi Chiba, Shibukawa (JP)

(73) Assignee: Japan Carlit Co., Ltd., Tokyo (JP)

( * ) Notice: Subject to any disclaimer, the term of this patent is extended or adjusted under 35 U.S.C. 154(b) by 134 days.

(21) Appl. No.: 10/569,733

(22) PCT Filed: Jul. 27, 2004

(86) PCT No.: PCT/JP2004/011011

§ 371 (c)(1),
(2), (4) Date: Feb. 28, 2006

(87) PCT Pub. No.: WO2005/022571

PCT Pub. Date: Mar. 10, 2005

(65) Prior Publication Data

US 2006/0274475 A1    Dec. 7, 2006

(30) Foreign Application Priority Data

Aug. 29, 2003  (JP) .............. 2003-305885
Feb. 3, 2004   (JP) .............. 2004-026345

(51) Int. Cl.
*H01G 9/00* (2006.01)
*H01G 9/02* (2006.01)

(52) U.S. Cl. .............. 361/502; 361/503; 252/62.2
(58) Field of Classification Search .......... 361/502–503; 252/62.2; 29/25.03
See application file for complete search history.

(56) References Cited

U.S. PATENT DOCUMENTS

2002/0028389 A1 * 3/2002 Sonoda et al.

FOREIGN PATENT DOCUMENTS

| JP | 02-069916 | 3/1990 |
|---|---|---|
| JP | 02-125410 | 5/1990 |
| JP | 08-045792 | 2/1996 |
| JP | 11-238653 | 8/1999 |
| JP | 2001-148332 | 5/2001 |
| JP | 2002-033249 | 1/2002 |

OTHER PUBLICATIONS

Makoto UE, et al., "Electrochemical Properties of Organic Liquid Electrolytes Based on Quaternary Onium Salts for Electrical Double-Layer Capacitors", J. Electrochem. Soc., vol. 141, No. 11, Nov. 1994, pp. 2989-2996.

* cited by examiner

*Primary Examiner*—Eric Thomas
(74) *Attorney, Agent, or Firm*—Oblon, Spivak, McClelland, Maier & Neustadt, P.C.

(57) ABSTRACT

An electrolytic solution for an electric double layer capacitor is provided. A spiro compound of formula (1) is provided as an electrolyte in an aprotic solvent. The electric conductivity of the solution at −40° C. is 0.85 mS/cm or higher.

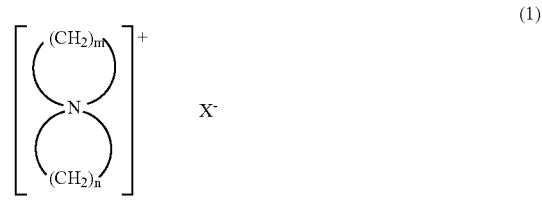

(1)

This electrolytic solution provides a high dissolution of electrolyte in solvent and exhibits excellent conductivity and electrostatic capacity over a wide range of temperatures Further, the electrolytic solution exhibits high resistance to voltage, even under long-term high voltage load, and exhibits suppressed lowering of electrostatic capacity allowing the solution to excel in long-term stability.

13 Claims, 1 Drawing Sheet

ELECTROLYTIC SOLUTION FOR ELECTRIC DOUBLE LAYER CAPACITOR AND ELECTRIC DOUBLE LAYER CAPACITOR

TECHNICAL FIELD

The present invention relates to an electrolytic solution for an electrical double layer capacitor and an electrical double layer capacitor, and in particular, to an electrolytic solution for an electrical double layer capacitor excelling in low temperature characteristics and the like and to an electrical double layer capacitor.

BACKGROUND ART

An electrical double layer capacitor is a charge accumulation device utilizing an electrical double layer formed in the interface of polarizable electrodes and an electrolytic solution.

When the electrolytic solution used in an electrical double layer capacitor possesses a low electric conductivity, the internal resistance of the electrical double layer capacitor increases thereby decreasing the voltage of the capacitor during charging and discharging. Therefore, an electrolytic solution used in an electrical double layer capacitor is required to possess a high electric conductivity.

Another requirement for an electrolytic solution is the capability of providing the capacitor using the electrolytic solution with a sufficiently large electrostatic capacity.

These characteristics are required to exhibit a small dependence on temperature. Specifically, the capacitor is required to maintain excellent electric conductivity and electrostatic capacity at a low temperature.

In addition to the above characteristics, the electrolytic solution is required to be durable over a long period of time.

When the electrolyte concentration of the electrolytic solution is low, the internal resistance of the capacitor increases during charging with a large current density due to an insufficient amount of ions. Therefore, the electrolytic solution preferably has an electrolyte concentration as high as possible.

However, because the electrolytes in the electrolytic solution tend to precipitate at a low temperature when the electrolyte concentration of an electrolytic solution is increased, the electrolyte concentration of the electrolytic solution must be maintained at a low level. This, however, decreases conductivity and impairs the above charging and discharging characteristics. In order to solve these problems, crystal precipitation of the electrolyte at a low temperature must be prevented by increasing the solubility of the electrolyte in the electrolytic solution. In addition, the electrolyte concentration of the electrolytic solution must be increased in order to overcome the above problems.

As an electrolytic solution conventionally used in electrical double layer capacitors, a solution comprising an electrfrolyte such as a linear alkyl quartenary ammonium salt (e.g. tetraethyl ammonium salt) and a quartenary phosphonium salt dissolved in an aprotic solvent such as y-butyrolactone (hereinafter referred to as "GBL") and propylene carbonate (hereinafter referred to as "PC") can be given.

However, since these electrolytes have a low solubility in the organic solvent of about 0.7-1.5 mol/l, the electrolytic solution has a low conductivity, possibly giving rise to the previously mentioned problems of impaired charging and discharging characteristics.

In addition, a capacitor using an electrolytic solution comprising linear alkyl quartenary ammonium salt, quartenary phosphonium salt, or the like tends to have a low electrostatic capacity and a large internal resistance at a low temperature. Specifically, the capacitor also possesses a problem in regard to major change in the characteristics due to a temperature change.

Recently, an electrolytic solution comprising N,N'-dialkyl substituted imidazolium salt having a high solubility in the above organic solvent of about 3 mol/l as an electrolyte has been proposed (for example, Japanese Patent No. 2945890).

However, the electrolytic solution comprising N,N'-dialkyl substituted imidazolium salt as an electrolyte has a high viscosity and an unduly decreased conductivity at a low temperature as compared with the electrolytic solution comprising linear alkyl quartenary ammonium salt or quarternary phosphonium salt as an electrolyte. The electrical double layer capacitor manufactured using this electrolytic solution exhibits a problem in long term reliability. The electrostatic capacity is reduced greatly when the capacitor is subjected to a high voltage load over a long period of time.

In view of the above, the object of the present invention is to provide an electrolytic solution for an electrical double layer capacitor capable of dissolving an electrolyte in a high concentration, having excellent conductivity and ensuring excellent electrostatic capacity in a wide temperature range from a low temperature to a high temperature, possessing a high withstand voltage, and exhibiting excellent long term reliability with electrostatic capacity decreasing only with difficulty under a high voltage load for a long period of time. The present invention also provides an electrical double layer capacitor using the electrolytic solution.

DISCLOSURE OF THE INVENTION

As a result of diligent research concerning an electrolytic solution for an electrical double layer capacitor, the present inventor has discovered that an electrolytic solution comprising a specific cyclic ammonium salt as an electrolyte possesses high solubility and exhibits excellent electric conductivity and electrostatic capacity at a low temperature, with least characteristic changes in a wide temperature range and excellent long term reliability. This finding has led to the completion of the present invention.

Specifically, the present invention provides an electrolytic solution for an electrical double layer capacitor comprising a spiro compound shown by the following formula (1) as an electrolyte dissolved in an aprotic solvent, the electrolytic solution having an electric conductivity of 0.85 mS/cm or more at −40° C.

The present invention also provides an electrolytic solution for an electrical double layer capacitor to be used in cold regions.

The present invention also provides an electrical double layer capacitor to be used in cold regions manufactured using the above electrolytic solution for an electrical double layer capacitor.

The present invention further provides a method for lowering the temperature dependence of the electrostatic capacity and/or internal resistance of an electrical double layer capacitor comprising filling the inside of an electrical double layer capacitor with an electrolytic solution comprising spiro-(1,1)-bipyrrolidinium tetrafluoroborate or piperidine-1-spiro-1'-pyrrolidinium tetrafluoroborate dissolved in an aprotic solvent.

Figure 1:
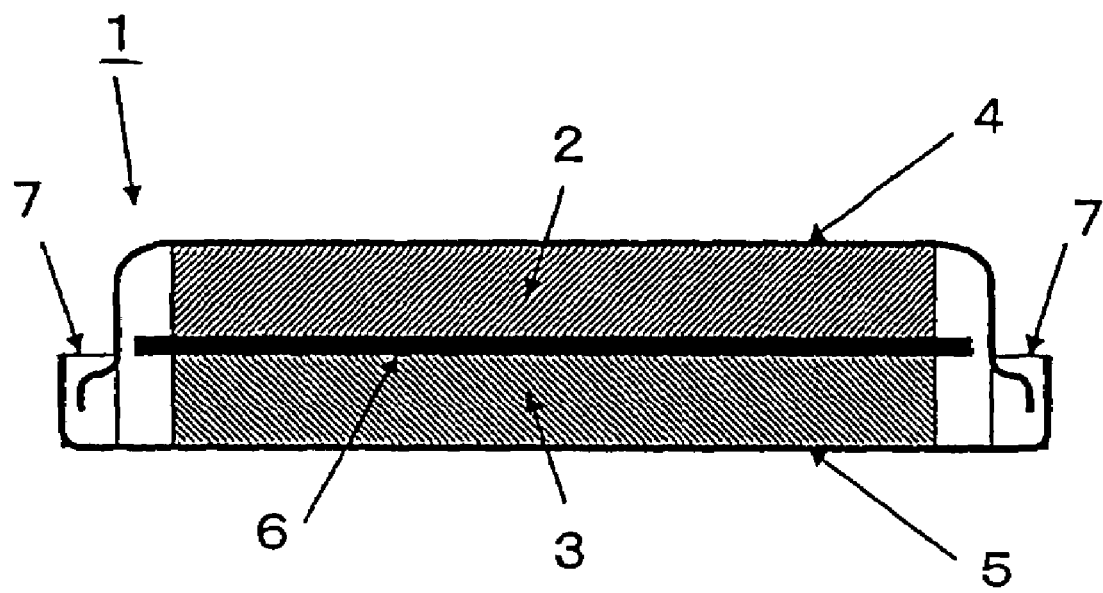
FIG. 1 illustrates a cross-sectional view of an example of the structure of the electrical double layer capacitor.

The following is an explanation of the symbols used in the figure.

1 Electrical double layer capacitor
2 First electrode (negative)
3 Secondary electrode (positive)
4 First container body
5 Secondary container body
6 Separator
7 Non-conductive material

BEST MODE FOR CARRYING OUT THE INVENTION

The electrolytic solution for an electrical double layer capacitor of the present invention will now be described in detail.

The electrolytic solution for an electrical double layer capacitor of the present invention comprises a spiro compound of the following formula (1) as an electrolyte dissolved in an aprotic solvent,

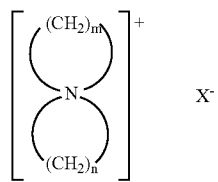

(1)

wherein, m and n individually represent a natural number of 3-7, and $X^-$ is a counter anion.

Although there are no restrictions to the spiro compound (1) used in the present invention, m and n in the formula (1) preferably individually represent a natural number of 4-6, with 4-5 being particularly preferable.

There are no restrictions to the counter anion for $X^-$ in the spiro compound (1). Examples of the counter anion include a tetrafluoroborate anion, hexafluorophosphate anion, perchloric acid anion, bistrifluoromethanesulfonimide anion, and the like. Of these, a tetrafluoroborate anion is particularly preferable.

As particularly preferable specific examples of the spiro compound (1) of the present invention, spiro-(1,1')-bipyrrolidinium tetrafluoroborate (hereinafter referred to as "SBP—$BF_4$") shown by the following formula (2), piperidine-1-spiro-1'-pyrrolidinium tetrafluoroborate (hereinafter referred to as "PSP—$BF_4$") shown by the following formula (3), spiro-(1,1')-bipiperidinium tetrafluoroborate, and the like can be given.

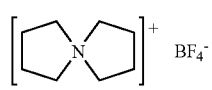

(2)

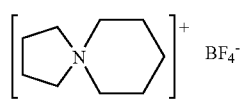

(3)

Since both the SBP—$BF_4$ and PSP—$BF_4$ shown by the above formulas (1) and (2) have a high solubility in the aprotic solvent and precipitate crystals at a low temperature only with difficulty, a highly concentrated electrolytic solution can be obtained. The obtained electrolytic solution exhibits excellent electrical conductivity in a wide temperature range from a low temperature to a high temperature and the electrical double layer capacitor obtained using this electrolytic solution exhibits excellent internal resistance and electrostatic capacity in a wide temperature range from a low temperature to a high temperature.

Although there are no restrictions to the method for synthesizing the spiro compound (1) of the present invention, the following method for synthesizing SBP—$BF_4$ can be given as a specific example.

First, pyrrolidine is reacted with a butane dihalide as a halogenating agent to obtain a spiro-(1,1')bipyrrolidinium halide, which is subjected to electrodialysis using an ion exchange membrane to obtain a spiro-(1,1')bipyrrolidinium hydroxide aqueous solution.

Next, the obtained spiro-(1,1')bipyrrolidinium hydroxide aqueous solution is neutralized with an equivalent amount of tetrafluoroborate ($HBF_4$) and dehydrated under reduced pressure to obtain SBP—$BF_4$.

The following can be given as a method for synthesizing PSP—$BF_4$.

First, piperidine is reacted with a butane dihalide as a halogenating agent to obtain a piperidine-1-spiro-1'-pyrrolidinium halide, which is subjected to electrodialysis using an ion exchange membrane to obtain a piperidine-1-spiro-1'-pyrrolidinium hydroxide aqueous solution.

Next, the obtained piperidine-1-spiro-1'-pyrrolidinium hydroxide aqueous solution is neutralized with an equivalent amount of tetrafluoroborate ($HBF_4$) and dehydrated under reduced pressure to obtain PSP—$BF_4$.

There are no restrictions to the aprotic solvent used in the present invention as long as it is commonly used for an electrolytic solution for an electrical double layer capacitor. Examples of the aprotic solvent include PC, GBL, acetonitrile, dimethyl formamide, sulfolane, and 1,2-dimethoxyethane. Of these, PC and/or GBL are preferable in view of electrolyte solubility, electric conductivity, temperature independency of these characteristics, electrolyte durability, toxicity, and the like.

The electrolytic solution used in the electrical double layer capacitor of the present invention is required to have a conductivity of 0.85 mS/cm (0.85 $m\Omega^{-1}cm^{-1}$) or more at $-40°$ C.

Specifically, the electrolytic solution of the present invention, which comprises a combination of an electrolyte and an aprotic solvent obtained by dissolving an electrolyte in an aprotic solvent, is required to have a conductivity of 0.85 mS/cm (0.85 $m\Omega^{-1}cm^{-1}$) or more at $-40°$ C.

The electrolytic solution preferably has a conductivity of 1 mS/cm (1 $m\Omega^{-1}cm^{-1}$) or more.

Although there are electrolytes exhibiting electrical conductivity within the above range other than the spiro compound (1), none of these electrolytes fully satisfy all of the above-mentioned property requirements.

The electrostatic capacity decrease rate of the electrical double layer capacitor obtained using the electrolytic solution of the present invention at $-20°$ C. from $20°$ C. (hereinafter referred to as "electrostatic capacity decrease rate" or "$K_C$") is preferably 5% or less. The electrolyte and aprotic solvent are appropriately selected to satisfy this requirement. A particularly preferable $K_C$ is 3% or less, with a $K_C$ of 2% or less being even more preferable.

The electrostatic capacity decrease rate ($K_C$) of the electrolytic solution is determined using the following equation (3), wherein C(20° C.) is the electrostatic capacity of the electrical double layer capacitor obtained using the electrolytic solution at 20° C. and C(−20° C.) is the electrostatic capacity at −20° C.

$$K_C=100\times[C(20°\,C.)-C(-20°\,C.)]/C(20°\,C.) \quad (3)$$

It is preferable that the electrical double layer capacitor obtained using the electrolytic solution of the present invention has an internal resistance at −20° C. of 5 times or less of the internal resistance of the electrical double layer capacitor at 20° C. This ratio of internal resistance is indicated by "$K_R$".

In the electrolytic solution of this invention, it is preferable to select a combination of the electrolyte and aprotic solvent to produce a saturated electrolyte concentration of 2 mol/l or more at −40° C. An electrolytic solution possessing the above-described excellent characteristics can be obtained by appropriately adjusting the concentration of the electrolyte, when the electrolytic solution is made from such a combination of the electrolyte and an aprotic solvent.

If the electrolyte concentration of the electrolytic solution is too low, the conductivity of the electrolytic solution may be insufficient. If the electrolyte concentration of the electrolytic solution is too high, the low temperature performance declines remarkably, and the economical efficiency of the solution decreases.

Preferable electrolytic solutions of the present invention will now be described in detail using SBP—$BF_4$ and PSP—$BF_4$.

As an example of a preferable electrolytic solution, a solution comprising SBP—$BF_4$ dissolved in an aprotic solvent can be given. Although there are no restrictions to the SBP—$BF_4$ concentration, a concentration of 0.5-4 mol/l is preferable, with 1-3.5 mol/l being particularly preferable. As a solution having a higher electrolyte concentration, a solution comprising SBP—$BF_4$ at a concentration of 2-3.5 mol/l is preferable, with 2.3-2.7 mol/l being particularly preferable.

As another example of a preferable electrolytic solution of the present invention, a solution comprising PSP—$BF_4$ dissolved in an aprotic solvent can be given. Although there are no restrictions to the PSP—$BF_4$ concentration, a concentration of 0.5-4 mol/l is preferable, with 0.5-3 mol/l being particularly preferable. A PSP—$BF_4$ concentration of 1-2 mol/l is even more preferable.

When necessary, the electrolytic solution of the present invention as described above may comprise additives in addition to the electrolyte. Examples of these additives include phosphorous compounds such as phosphoric acid and phosphate; boric acid compounds such as boric acid, a complex of boric acid and a polysaccharide (mannitol, sorbitol, and the like), and a complex of boric acid and a polyhydric alcohol (ethylene glycol, glycerol, and the like); and nitro compounds such as p-nitrobenzoic acid and p-nitrophenol.

Although there are no limitations to the amount of the additive, an amount within a range of 0-3 wt % of the total amount of the electrolytic solution is preferable, with 0.1-1 wt % being particularly preferable.

The electrical double layer capacitor of the present invention is manufactured by placing a separator between two capacitor polarizable electrodes, impregnating the polarizable electrodes with the electrolytic solution of the present invention as a drive electrolytic solution, and packing the fabricated body in an exterior case.

Although there are no particular restrictions to the polarizable electrodes, polarizable electrodes formed from a porous carbon material such as activated carbon powder and carbon fiber; a noble metal oxide material such as ruthenium oxide; and a conductive polymeric material such as polypyrrole and polythiophene are preferable, with a porous carbon material being particularly preferable.

There are no particular limitations to the shape of the electrical double layer capacitor using the electrolytic solution of the present invention. Examples include a film type, coin type, cylinder type, and box type.

FIG. 1 can be given as one example of the structure of the electrical double layer capacitor, comprising a first electrode and a second electrode, each formed from a sheet-type carbon electrode, placed on either side of a separator, impregnated with an electrolytic solution, and sealed in a first container and a second container which are electrically disconnected by a non-conductive material.

In the electrical double layer capacitor 1 of FIG. 1, the first electrode is represented by 2, the second electrode is represented by 3, the first container is represented by 4, the second container is represented by 5, the separator is represented by 6, and the non-conductive material is represented by 7. In the electrical double layer capacitor 1 of FIG. 1, the first electrode 2 is a negative electrode 2 and the second electrode 3 is a positive electrode 3.

There are no limitations to the material used for the first container 4 and the second container 5 as long as it is a conductive material that will not corrode in the presence of the electrolytic solution. Examples include aluminum and stainless steel.

From performance and economical view points, the negative electrode 2 and the positive electrode 3 connected electrically to these containers are preferably formed from a carbon material such as activated carbon powder and carbon fiber formed using a binder. There are no limitations to the material used for the separator 6 placed between the negative electrode 2 and the positive electrode 3 as long as the electrolytic solution can easily pass through the separator and the material is electrically and chemically stable. Preferable examples include a polyolefin nonwoven fabric, porous Teflon, and rayon paper.

As an example of a method for manufacturing the electrical double layer capacitor, a method comprising filling the space inside the first container and the second container with the electrolytic solution of the present invention thereby impregnating the negative electrode 2 and positive electrode 3 with the electrolytic solution, and sealing the first container 4 and second container 5 with a non-conductive material 7 can be given.

As a preferable method for impregnating the electrodes with the electrolytic solution of the present invention, a method comprising vacuum drying each of the materials used in the capacitor with heating at 120-300° C., injecting the electrolytic solution into the negative electrode 2 and positive electrode 3 in a dry argon gas, and aging the electrodes can be given. Aging is preferably conducted by charging the device at a voltage of 2-3 V at room temperature for about 5-100 hours. Finally, defoaming under reduced pressure is preferably conducted thereby completing the electrical double layer capacitor of the present invention.

The electrolytic solution for electrical double layer capacitor of the present invention does not coagulate at a low temperature and possesses high electrical conductivity and electrostatic capacity in a wide temperature range. The electrical double layer capacitor obtained using the electrolytic solution has a low dependency on temperature.

Since the electrolytic solution can be used stably at a temperature of −20° C., the electrolytic solution is particularly preferably used in an electrical double layer capacitor for stable use in cold regions of −20° C. or less.

EXAMPLES

The present invention will be described in more detail by examples, which should not be construed as limiting the present invention.

Preparation Example

<Preparation of Electrolytic Solution for Electrical Double Layer Capacitor>

Electrolytic solutions for electrical double layer capacitor (1)-(7) were prepared by dissolving the ammonium salts shown in Table 1 as electrolytes in PC at the concentrations shown in Table 1.

The reason for different electrolyte concentrations of the electrolytic solutions (5)-(7) is that each of the solutions was adjusted in order to obtain the highest electrical conductivity possible so that the electrolytic solution possessed the best possible characteristics.

TABLE 1

| Electrolytic solution No. | Electrolyte | Solvent | Electrolyte concentration (mol/l) |
|---|---|---|---|
| 1 | SBP-BF$_4$ | PC | 2.50 |
| 2 | SBP-BF$_4$ | PC | 1.50 |
| 3 | PSP-BF$_4$ | PC | 2.50 |
| 4 | PSP-BF$_4$ | PC | 1.50 |
| 5 | TEA-BF$_4$ | PC | 0.69 |
| 6 | TEMA-BF$_4$ | PC | 1.80 |
| 7 | TMI-BF$_4$ | PC | 2.50 |

The electrolytes shown in the table are as follows:
SBP-BF$_4$: spiro-(1,1)-bipyrrolidinium tetrafluoroborate
PSP-BF$_4$: piperidine-1-spiro-1'-pyrrolidinium tetrafluoroborate
TEA-BF$_4$: tetraethylammonium tetrafluoroborate
TEMA-BF$_4$: triethlymethylammonium tetrafluoroborate
TMI-BF$_4$: 1,2,3,4-tetramethylimidazolium tetrafluoroborate

Measurement Example 1

<Method for Measuring Electric Conductivity>

The electric conductivity of the electrolytic solutions at 30° C. and −40° C. was measured using a CM-20S conductivity meter (manufactured by DKK-TOA Corporation).

The results of the measurement are shown in Table 2. The values shown in the table are the average values of 15 samples.

As can be seen in Table 2, the electrolytic solutions 1-4 of the present invention exhibited a higher electrical conductivity in a wide temperature range than the electrolytic solutions 5 and 6 comprising linear alkyl quarternary ammonium salts of a conventional electrolyte.

Measurement Example 2

<Method for Measuring Electrostatic Capacity>

90 wt % of activated carbon powder (particle diameter: 20 µm; specific surface area: 2000 m$^2$/g) and 10 wt % of polytetrafluoroethylene powder were kneaded and rolled with a roller to form a sheet having a thickness of 0.4 mm. Disk-shaped electrodes with a diameter of 13 mm φ were punched from the sheet.

A polypropylene separator was placed between two of the above disk-shaped electrodes, the electrodes were impregnated with a previously prepared electrolytic solution under vacuum and placed in a stainless steel case, and the case was sealed by applying a stainless steel cap via a gasket to integrate the case and cap, thereby obtaining a coin type electrical double layer capacitor with a rated voltage of 3.3 V.

After charging the obtained electrical double layer capacitor at a voltage of 3.3 V and a temperature of 20° C. for one hour, the electrostatic capacity was determined from the voltage gradient when the capacitor was discharged at 1 mA (hereinafter referred to as "C(20° C.)"). A CDT-RD charge-discharge tester (manufactured by Power Systems Co., Ltd.) was used for the measurement.

The results are shown in Table 2. The values shown in the table are the average values of 15 samples.

Measurement Example 3

<Method for Evaluating Long-Term Reliability (Method for Measuring Electrostatic Capacity Decrease Rate)>

After charging each of the electrical double layer capacitors obtained in the Measurement Example 2 at a voltage of 3.3 V for 1,000 hours in an oven at 70° C., the electrostatic capacity of the electrical double layer capacitors was measured at 20° C. in accordance with the above method for measuring electrostatic capacity (hereinafter referred to as "$C_{1000hr}$").

Electrostatic capacity decrease rate (%) (hereinafter referred to as "A").

$$A = 100 \times (C(20°\ C.) - C_{1000hr})/C(20°\ C.)$$

The electrostatic capacity decrease rate (%) of the electrical double layer capacitors was determined by the above formula and the results are shown in Table 2. The values shown in the table are the average values of 15 samples.

The long-term reliability was evaluated by means of the electrostatic capacity decrease rate A.

TABLE 2

| Electrolytic solution No. | Electrical conductivity (mS/cm) | | Electrostatic capacity C(20° C.) (F) | Long term reliability | | Decrease rate A (%) |
|---|---|---|---|---|---|---|
| | 30° C. | −40° C. | | C(20° C.) (F) | $C_{1000\ hr}$ (F) | |
| 1 | 20.41 | 1.53 | 1.55 | 1.55 | 1.41 | 9.0 |
| 3 | 19.11 | 1.45 | 1.55 | 1.55 | 1.44 | 7.1 |
| 5 | 11.21 | 1.31 | 1.57 | 1.57 | 1.34 | 14.8 |
| 6 | 16.15 | 1.45 | 1.55 | 1.55 | 1.30 | 16.2 |
| 7 | 20.27 | 1.08 | 1.58 | 1.58 | 0.68 | 57.1 |

As shown in Table 2, the capacitors manufactured using the electrolytic solutions 5-7 possessed a low electrostatic capacity after being charged at a voltage of 3.3 V for 1,000 hours in an oven at 70° C., which resulted in a large electrostatic capacity decrease rate A. The capacitors manufactured using the electrolytic solutions 1 and 3 of the present invention, on the other hand, exhibited only a small electrostatic capacity decrease rate A, whereby they were determined to excel in long-term reliability.

Measurement Example 4

<Method for Measuring Low Temperature Characteristics>

Except for measuring at a temperature of −20° C. instead of 20° C., the electrostatic capacity of the electrical double layer capacitors was measured in the same manner as in Measurement Example 2 (hereinafter referred to as "C(−20° C.)").

The electrostatic capacity decrease rate $K_C$ in regard to C(20° C.) of Measurement Example 2 was determined by the following equation (3).

$$K_C = 100 \times [C(20°\ C.) - C(-20°\ C.)] / C(20°\ C.) \tag{3}$$

Measurement Example 5

<Method for Measuring Internal Resistance>

The internal resistance of the electrical double layer capacitors prepared in Measurement Example 2 at 20° C. and −20° C. was measured using the CDT-RD charge-discharge tester (manufactured by Power Systems Co., Ltd.).

The results are shown in Table 3.

TABLE 3

| Electrolytic solution No. | Electrostatic capacity (F) | | Electrostatic capacity decrease rate $K_c$ (%) | Internal resistance (mΩ) | | $K_R$ (times) |
|---|---|---|---|---|---|---|
| | 20° C. | −20° C. | | 20° C. | −20° C. | |
| 1 | 1.55 | 1.53 | 1.3 | 22 | 101 | 4.6 |
| 3 | 1.55 | 1.52 | 1.9 | 27 | 109 | 4.0 |
| 5 | 1.57 | 1.35 | 14.0 | 31 | 161 | 5.2 |
| 6 | 1.55 | 1.45 | 6.5 | 26 | 115 | 4.4 |
| 7 | 1.58 | 1.53 | 3.2 | 20 | 96 | 4.8 |

As is clear from Table 3, the electrostatic capacity of the electrical double layer capacitors manufactured using the electrolytic solutions 1 and 3 of the present invention decreased only slightly, thereby showing a small electrostatic capacity decrease rate KC. The capacitors manufactured using the electrolytic solutions 1 and 3 of the present invention also possessed only a small internal resistance at −20° C.

The capacitors manufactured using the electrolytic solutions 5-7, on the other hand, showed a large electrostatic capacity decrease rate KC. Also, the capacitors manufactured using the electrolytic solutions 5 and 6 possessed a large internal resistance.

Although the capacitor manufactured using the electrolytic solution 7 exhibited comparatively good low temperature characteristics among the capacitors manufactured using the electrolytic solutions 5-7, as shown in Table 3, it exhibited an extremely bad electrostatic capacity decrease rate A, thereby indicating insufficient long term reliability, as shown in Table 2.

The above results show that the electrolytic solutions 1-4 of the present invention display excellent overall characteristics.

INDUSTRIAL APPLICABILITY

The electrolytic solution for the electrical double layer capacitor of the present invention comprising a spiro compound shown by the formula (1) as an electrolyte dissolved in an aprotic solvent and having an electric conductivity of 0.85 mS/cm or more at −40° C. exhibits excellent electric conductivity and electrostatic capacity in a wide temperature range from a low temperature to a high temperature and a high voltage resistance. The electrolytic solution possesses excellent long term reliability, with the electrostatic capacity decreasing only with difficulty under a high voltage load over a long period of time. Furthermore, due to the excellent low temperature characteristics in particular, the electrical double layer capacitor manufactured using this electrolytic solution can be used in a wide range of industries from miniature electronic instruments to large automobiles.

What is claimed is:

1. An electrolytic solution for an electrical double layer capacitor comprising a spiro compound of the formula (1) as an electrolyte dissolved in an aprotic solvent and having a conductivity of 0.85mS/cm or more at −40° C,

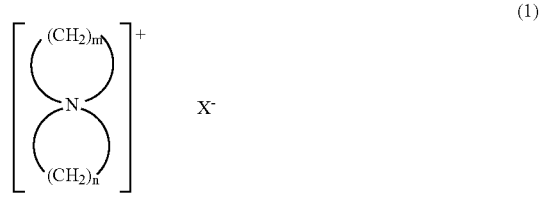

wherein m and n individually represent a natural number from 3-7 and X- represents a tetrafluoroborate anion.

2. The electrolytic solution for electrical double layer capacitor according to claim 1, wherein the electrostatic capacity of the electrical double layer capacitor when used at −20° C. decreases by 5% or less from the electrostatic capacity when used at 20° C.

3. The electrolytic solution for electrical double layer capacitor according to claim 1 or 2, wherein the spiro compound shown by the formula (1) is spiro-(1,1)-bipyrrolidinium tetrafluoroborate or piperidine-1-spiro-1'-pyrrolidinium tetrafluoroborate.

4. The electrolytic solution for electrical double layer capacitor according to claim 1, wherein the aprotic solvent is propylene carbonate and/or γ-butyrolactone.

5. The electrolytic solution for an electrical double layer capacitor according to claim 1, comprising a mixture of an electrolyte and an aprotic solvent having a saturated electrolyte concentration of 2 mol/l or more at 40° C.

6. The electrolytic solution for an electrical double layer capacitor according to claim 1, which can be stably used at −20 C.

7. The electrolytic solution for an electrical double layer capacitor according to claim 1, wherein the spiro-(1,1)-bipyrrolidinium tetrafluoroborate is dissolved in the aprotic solvent at a concentration in a range of 2-3.5 mol/l.

8. The electrolytic solution for an electrical double layer capacitor according to claim 1, wherein the piperidine-1- spiro-1'-pyrrolidinium tetrafluoroborate is dissolved in the aprotic solvent at a concentration in a range of 0.5-3 mol/l.

9. The electrolytic solution for an electrical double layer capacitor according to claim 1 for use in cold regions.

10. An electrical double layer capacitor manufactured using the electrolytic solution according to claim 1.

11. The electrical double layer capacitor according to claim 10 comprising a first container, a first electrode electrically connected to the first container, a second container, a second electrode electrically connected to the second container, and a separator separating the first electrode and the second electrode, wherein the space inside the first container and the second container is filled with the electrolytic solution and the first container and the second container are sealed with a nonconductive material which prevents electrical connection between the containers.

12. The electrical double layer capacitor according to claim 10, manufactured using the electrolytic solution according to any one of claims 1-9 for use in cold regions.

13. A method for lowering the temperature dependence of the electrostatic capacity and/or internal resistance of an electrical double layer capacitor comprising filling the inside of the electrical double layer capacitor with an electrolytic solution comprising spiro-(1,1)-bipyrrolidinium tetrafluoroborate or piperidine-1-spiro-1'-pyrrolidinium tetrafluoroborate dissolved in an aprotic solvent.

* * * * *